United States Patent
Ichtertz

(10) Patent No.: US 9,730,161 B2
(45) Date of Patent: Aug. 8, 2017

(54) RADIO MODULE WITH SCHEDULE FOR CONTROLLING POWER CONSUMPTION OF A FIELD DEVICE AND TRANSMITTING FIELD DEVICE DATA TO A SUPERORDINATED UNIT

(71) Applicant: Endress + Hauser Process Solutions AG, Reinach (CH)

(72) Inventor: Francois Ichtertz, Habsheim (FR)

(73) Assignee: ENDRESS + HAUSER PROCESS SOLUTIONS AG, Reinach (CH)

( * ) Notice: Subject to any disclaimer, the term of this patent is extended or adjusted under 35 U.S.C. 154(b) by 92 days.

(21) Appl. No.: 14/104,379

(22) Filed: Dec. 12, 2013

(65) Prior Publication Data

US 2014/0170989 A1    Jun. 19, 2014

(30) Foreign Application Priority Data

Dec. 19, 2012  (DE) .................. 10 2012 112 635

(51) Int. Cl.
*H04W 52/02*    (2009.01)

(52) U.S. Cl.
CPC ... *H04W 52/0235* (2013.01); *H04W 52/0216* (2013.01); *Y02B 60/50* (2013.01)

(58) Field of Classification Search
None
See application file for complete search history.

(56) References Cited

U.S. PATENT DOCUMENTS

| | | | |
|---|---|---|---|
| 7,231,283 B2 | 6/2007 | Maier | |
| 2008/0211664 A1* | 9/2008 | Griech et al. | ............... 340/539.1 |
| 2011/0134817 A1* | 6/2011 | Probst | ............... G05B 19/0423 370/311 |
| 2012/0022672 A1* | 1/2012 | Ruf | .......... G01D 1/00 700/79 |
| 2013/0082667 A1* | 4/2013 | Sinreich | ........ 323/234 |

FOREIGN PATENT DOCUMENTS

| | | |
|---|---|---|
| DE | 10155189 A1 | 7/2003 |
| EP | 1754116 B1 | 12/2009 |
| EP | 1442338 B1 | 8/2011 |
| WO | 03023536 A1 | 3/2003 |

OTHER PUBLICATIONS

Jul. 11, 2013 German Search Report, German Patent Office, Munich, Germany.

* cited by examiner

*Primary Examiner* — Alejandro Rivero
(74) *Attorney, Agent, or Firm* — Bacon & Thomas, PLLC

(57) ABSTRACT

A radio module for a field device, wherein the radio module contains a schedule, according to which process data, especially measurement data, are downloaded from the field device by means of the radio module and wirelessly transmitted to a superordinated unit. Based on the schedule, the radio module transmits to the field device control signals, which serve to control the power consumption of the field device.

13 Claims, 2 Drawing Sheets

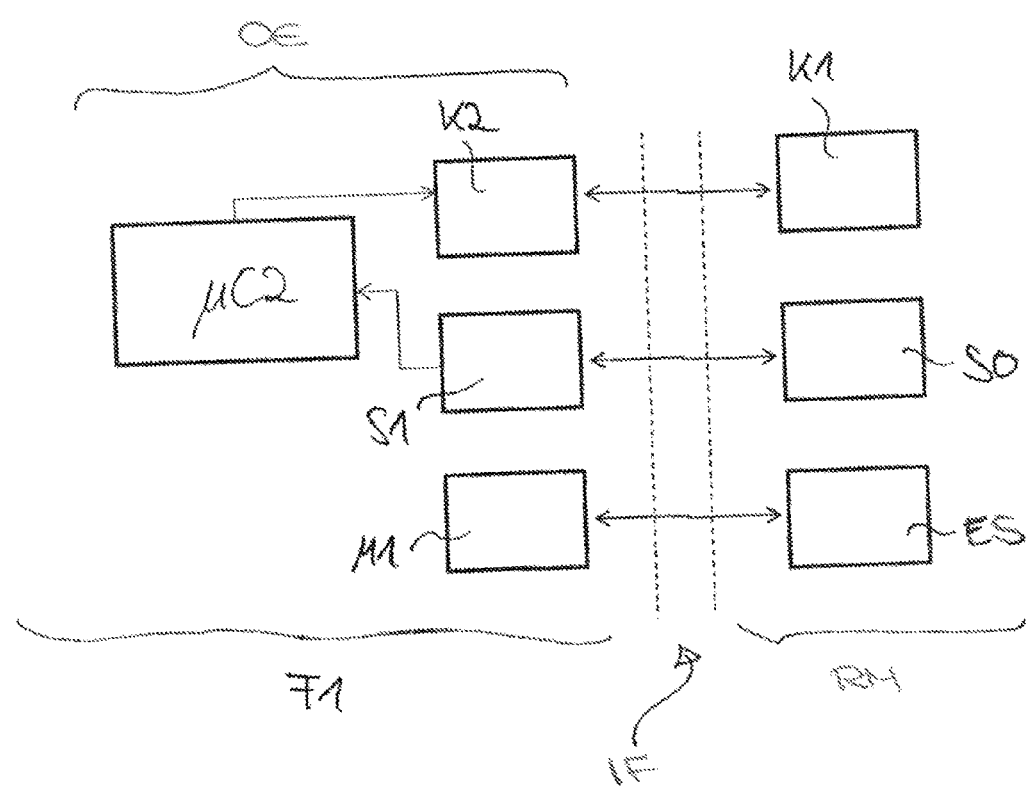

RADIO MODULE WITH SCHEDULE FOR CONTROLLING POWER CONSUMPTION OF A FIELD DEVICE AND TRANSMITTING FIELD DEVICE DATA TO A SUPERORDINATED UNIT

TECHNICAL FIELD

The invention relates to radio module for a field device as well as to a method for operating a field device.

BACKGROUND DISCUSSION

Known from the state of the art are a series of radio modules, which serve for retrofitting a field device with a radio module and, thus, for providing for wireless communication with the field device.

For example, one such radio module is disclosed in EP 1754116 B1, which radio module is connectable releasably with the sensor electronics of the field device at a field device interface or a conventional digital switch output.

Further known from EP 1442338 B1 is an apparatus composed of a radio module and a field device, wherein the radio module is connectable to a fieldbus interface of the field device.

Furthermore, it is known to provide the radio module with an energy supply, by means of which the connected field device can be supplied with electrical energy. The energy supply occurs, in such case, via an energy source with limited capacitance or capacity, such as, for example, a single-use battery or a rechargeable battery.

SUMMARY OF THE INVENTION

It is, thus, an object of the present invention to lengthen the operating- or service life of a field device coupled with a radio module having an energy source, respectively generally to save energy in such circumstances.

The object is achieved by a radio module for a field device as well as by a method for operating a field device.

As regards the radio module, the object is achieved by a radio module for a field device, wherein the radio module contains a schedule, according to which process data, especially measurement data, are downloaded from the field device by means of the radio module and wirelessly transmitted to a superordinated unit, wherein, based on the schedule, the radio module transmits to the field device control signals, which serve to control the power consumption of the field device.

In this way, the power consumption of the field device can be controlled depending on the function, respectively the functional scope, required of the field device. For example, only at certain times or in the case of certain predetermined conditions furnished in the schedule might it be required to emit a radio signal by means of the radio module. At points in time or under certain conditions, it is thus not required that the field device, for example, determines or processes a measured value or executes certain functions. It is, thus, an idea of the invention to reduce the power consumption of the field device during these phases, for instance, for a certain time or until certain predetermined conditions are fulfilled.

The schedule can be present, for example, in the form of a table containing points in time and/or time periods and/or conditions, such as, for example, the presence of a request for a diagnosis or the presence of an error report of the field device. Preferably, the schedule is stored in a memory unit of the radio module. The schedule can also be transmitted from the field device, for example, after connecting the radio module to the field device, from a memory unit of the field device to the radio module.

In a form of embodiment of the radio module, the control signals are transmitted via a signal line, which serves for transferring data between the field device and the radio module. The control signal, respectively the control signals, can preferably be digital signals, which are transmitted via the signal line from a µC of the radio module to a µC of the field device.

In an additional form of embodiment of the radio module, the radio module includes a corresponding interface for data transmission to the field device. Preferably transmitted via the interface can be control signals for controlling the power consumption of the field device, as well as also process relevant data, such as, for example, measured values or parameters, respectively parameter values, as well as also the energy supply, thus the power consumed by the field device.

In an additional form of embodiment of the radio module, the radio module includes an energy source, by means of which the field device and the radio module are supplied with electrical energy. Preferably, the radio module and also the field device are supplied with electrical energy exclusively from the energy source of the field device. The energy source is an energy source with limited capacitance or capacity, for example, an energy source in the form, for example, of a single-use battery or a rechargeable battery or a fuel cell.

In an additional form of embodiment of the radio module, the field device has different operating modes, and the control signals serve to switch the field device from a first operating mode into a second operating mode, wherein the power consumptions of the field device differ from one another in the respective operating modes. For example, the field device can be matched in such a manner to the radio module, respectively the different operating modes of the field device can be known to the radio module and, for example, also thus be furnished in the schedule or at other locations in the radio module, that the radio module provides the correspondingly required operating mode as a function of the schedule and the process relevant data required by the field device by transmitting to the field device, respectively more exactly to the operating electronics of the field device, for example, a corresponding control signal of the radio module invoking the respective operating mode.

In an additional form of embodiment of the radio module, the first operating mode is an electrical current saving mode, such as, for example, a sleep mode, a hibernation mode or a standby mode. Furthermore, it can, in such case, be simply a mode of the field device, in which the registering of a measured variable is omitted, in order to save energy.

In an additional form of embodiment of the radio module, the second operating mode serves to ascertain a process variable and to transmit corresponding process data wirelessly by means of the radio module.

For example, a situation can also arise, wherein, indeed, a communication via the radio module is required, but no data needs to be downloaded currently from the field device. Therefore, it is not required that the field device be supplied, at this point in time, with electrical energy from the energy source of the radio module.

In an additional form of embodiment of the radio module, it is established by the schedule, at which points in time a process value is transmitted via the radio module, respectively at which point in time a process value is downloaded from the field device.

In an additional form of embodiment of the radio module, the radio module is connectable via the interface to a field device internal bus.

In an additional form of embodiment of the radio module, the radio module is embodied as an adapter for retrofitting the field device with a wireless communication interface.

In an additional form of embodiment of the radio module, the interface between the field device and the radio module is an inductive, respectively capacitive, interface.

In an additional form of embodiment of the radio module, the radio module and the field device are connectable with one another via a power control bus, i.e. a power management bus.

The object is achieved, furthermore, by a field device having an interface for data transmission, wherein a control system for controlling the power consumption of the field device is provided, which controls the power consumption of the field device by means of control signals transmitted from the radio module.

In a form of embodiment of the field device, the field device is a measuring device.

In an additional form of embodiment of the radio module, the field device is supplied by means of the radio module with electrical energy, which is transmitted across the interface.

As regards the method, the object is achieved by a method for operating a field device, wherein, based on a schedule contained in a radio module, process data, especially measurement data, are downloaded from the field device by means of the radio module and wirelessly transmitted to a superordinated unit, wherein the radio module transmits control signals to the field device based on the schedule, and wherein the power consumption of the field device is controlled by these control signals.

BRIEF DESCRIPTION OF THE DRAWINGS

The invention will now be explained in greater detail based on the appended drawing, the figures of which show as follows:

FIG. 2 is a schematic representation of the interface for data transmission between the field device and the radio module.

DETAILED DISCUSSION IN CONJUNCTION WITH THE DRAWINGS

Figure 1:
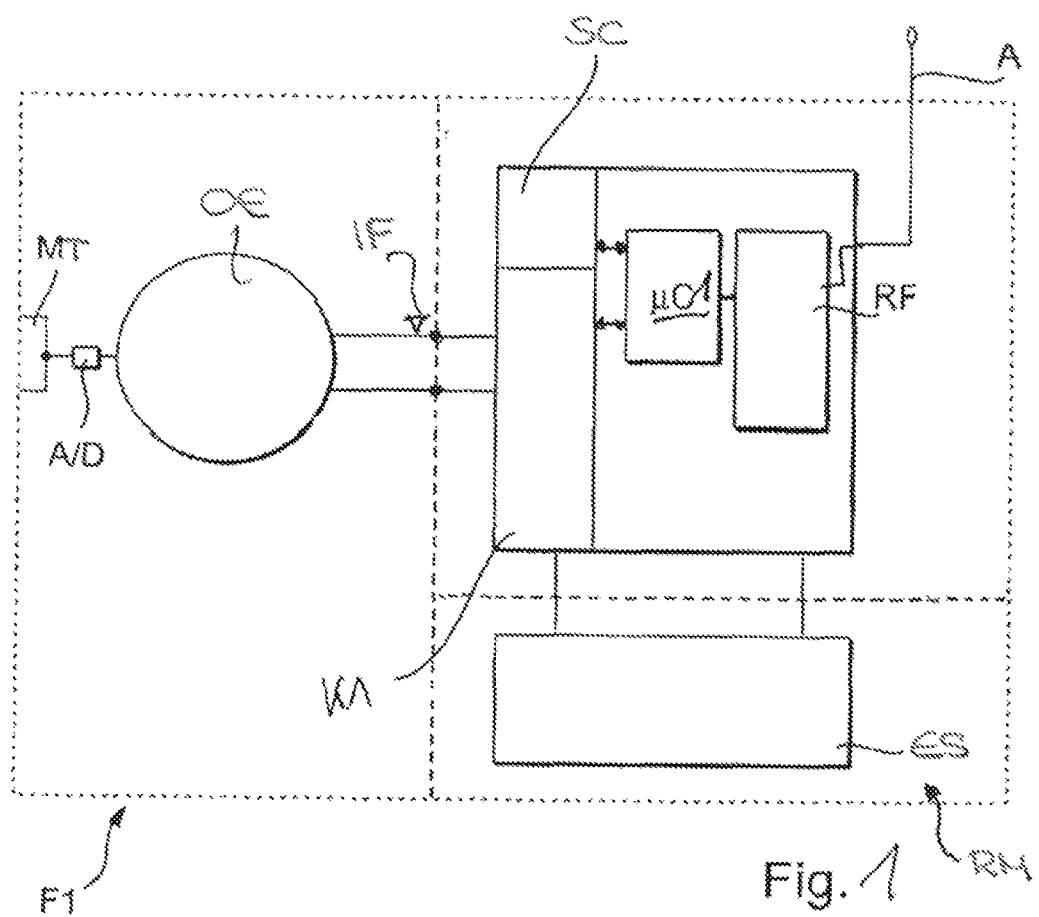
FIG. 1 is a schematic representation of a radio module connected to a field device.

FIG. 1 shows a field device F1, to which a radio module FM is connected.

The field device includes a measuring transducer MT, which serves for recording, ascertaining or registering a measured variable of a measured material. The measurement signal produced by the measuring transducer MT is fed, for example, via an analog to digital converter A/D, to an operating electronics OE.

The operating electronics OE can have, for example, a communication unit K2 and is connected with the radio module RM via the interface IF. Interface IF can serve for transmitting data as well as for supplying the field device F1 with electrical energy, respectively the required voltage, respectively the electrical current required therefor.

To this end, the radio module RM includes an energy supply unit ES, for example, a single-use battery.

Furthermore, the radio module RM includes an operating electronics, for example, in the form of a microprocessor $\mu C1$. Additionally, there is stored or furnished in the radio module RM a schedule SC, according to which the radio module RM with a superordinated unit, such as, for example, a servicing device, emits radio signals, in order to contain the process relevant data, which come, for example, from the field device.

As a function of the schedule SC, the radio module RM transmits not only process relevant data but also emits control signals via the interface IF for controlling the power consumption of the connected field device F1.

These control signals can serve to switch the field device F1 into certain operating states corresponding to the control signals.

For receiving the control signals, the field device F1 can contain a corresponding power module M1, which serves for controlling the power consumption of the field device F1. The radio module RM thus controls this power module M1. The power module M1 can then control the power consumption of the field device F1, for example, via a transistor, and/or communicate with the operating electronics OE of the field device F1, in order to bring about a certain operating mode specified by the control signals.

FIG. 2 shows a schematic representation of the interface IF between the field device F1 and the radio module RM. Interface IF can, in such case, be formed of one or more signal lines, which serve for transferring digital data between the field device F1 and the radio module RM, for transmission of electrical energy and/or for transmission of a control signal from the radio module RM to the field device F1.

For example, the interface IF can serve to connect the communication unit K2 of the field device F1 with the communication unit K1 of the radio module RM. Furthermore, the interface IF can serve to transmit the control signals, which serve for controlling the power consumption of the field device F1, from the communication unit S0 of the radio module to a corresponding control unit S1 of the field device F1, which control unit of the field device F1 serves to control the power consumption of the field device F1. Additionally, the interface IF can serve to connect a power module M0 of the radio module RM with a power module M1 of the field device F1. This can, such as shown in FIG. 2, occur via signal lines extending separately from one another.

Furthermore, such as shown, for example, in FIG. 2, the communication for data transmission between the field device F1 and the radio module RM as well as also the receiving and processing of the control signals can occur by means a microprocessor $\mu C2$ of the field device F1.

There is provided, thus, according to the invention, a radio module RM that can be arranged separately from the field device F1 and is connectable with the field device F1, for example, via a cable connection via the interface IF. Thus, it is possible, in spite of the fact that the radio module RM is not a standard component of the field device F1, to control the power consumption of the field device F1 by means of the radio module RM. In this way, a lengthening of the service life, respectively operating time, of the field device F1 and/or the radio module RM is achieved. Additionally, there results the opportunity for a simple replacement of the energy supply ES, such as, for example, a single-use battery, present in the radio module RM.

By way of example, a 4-20 mA signal and/or the HART-protocol can be used for data transmission of the process relevant data between the field device and the radio module.

The invention claimed is:

1. A radio module for a field device,
wherein said field device has a first operating mode, which is an electrical current saving mode,
wherein said field device has a second operating mode, which serves to ascertain a process variable and to transmit corresponding process data wirelessly by means of the radio module,
wherein the radio module contains a schedule, according to which process data are downloaded from the field device by means of the radio module and wirelessly transmitted to a superordinated unit, and wherein, based on said schedule, the radio module transmits to the field device control signals, which serve to switch the field device from said first operating mode to said second operating mode,
wherein the radio module further contains a first signal line directly connecting the field device to the radio unit with a first end point at the field device and a second end point at the radio module, for transferring process data between the field device and the radio module, a second signal line directly connecting the field device to the radio unit with a first end point at the field device and a second end point at the radio module for transmitting said control signals from the radio module to the field device, and a third signal line directly connecting the field device to the radio unit with a first end point at the field device and a second end point at the radio module;
wherein the radio module includes an energy source, by means of which the field device is supplied with electrical energy via the third signal line; and
wherein the signal lines are separate from one another.

2. The radio module as claimed in claim 1, wherein:
the radio module includes a corresponding interface for data transmission to the field device.

3. The radio module as claimed in claim 1, wherein:
the field device has different operating modes, and the control signals serve to switch the field device from a first operating mode into a second operating mode; and
said power consumption of the field device differs in the respective operating modes.

4. The radio module as claimed in claim 3, wherein:
said first operating mode is an electrical current saving mode.

5. The radio module as claimed in claim 3, wherein:
said second operating mode serves to ascertain a process variable and to transmit corresponding process data wirelessly by means of the radio module.

6. The radio module as claimed in claim 1, wherein:
it is established by said schedule, at which points in time a process value is transmitted via the radio module, and at which point in time a process value is downloaded from the field device.

7. The radio module as claimed in claim 1, wherein:
the radio module is connectable via an interface to a field device internal bus.

8. The radio module as claimed in claim 1, wherein:
the radio module is embodied as an adapter for retrofitting the field device with a wireless communication interface.

9. The radio module as claimed in claim 1, wherein:
an interface between the field device and the radio module is an inductive, or capacitive, interface.

10. The radio module as claimed in claim 1, wherein:
radio module and the field device are connectable with one another via a power control bus.

11. The radio module as claimed in claim 4, wherein:
said electrical current saving mode is a sleep mode, a hibernation mode or a standby mode.

12. A field device having an interface for data transmission, wherein:
said field device has a first operating mode, which is an electrical current saving mode,
said field device has a second operating mode, which serves to ascertain a process variable and to transmit corresponding process data wirelessly by means of a radio module,
a communication unit for transmitting process data to the radio module via a first signal line directly connecting the field device to the radio unit with a first end point at the field device and a second end point at the radio module is provided, and
a control system for controlling a power consumption of the field device is provided, which switches the field device from said first operating mode to said second operating mode by means of control signals transmitted from the radio module via a second signal line directly connecting the field device to the radio unit with a first end point at the field device and a second end point at the radio module,
wherein the field device is supplied by means of the radio module with electrical energy which is transmitted across the interface via a third signal line directly connecting the field device to the radio unit with a first end point at the field device and a second end point at the radio module, wherein the signal lines are separate from one another.

13. The field device as claimed in claim 12, wherein:
the field device is a measuring device.

* * * * *